Aug. 4, 1959     G. D. MEIER ET AL     2,898,258

PANEL AND FASTENER ASSEMBLY AND METHOD OF MAKING SAME

Filed Jan. 31, 1955     2 Sheets-Sheet 1

INVENTOR
GEORGE E. KLOOTE
GEORGE D. MEIER
JOSEPH A. POTCHEN

BY

ATTORNEY

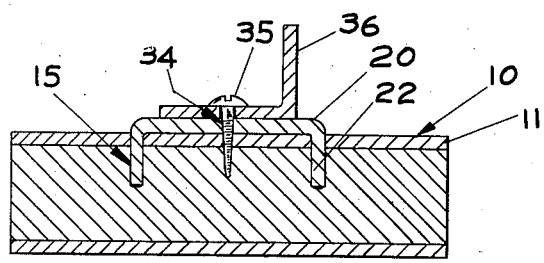
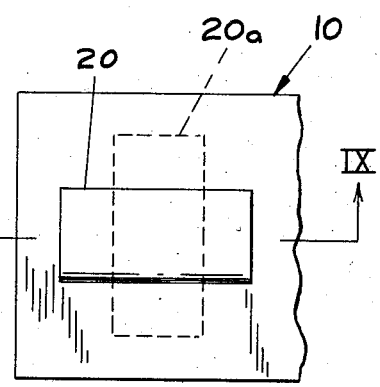
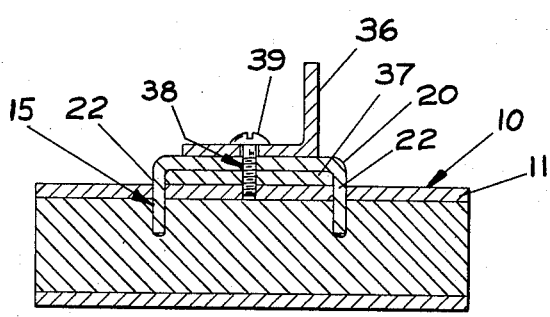
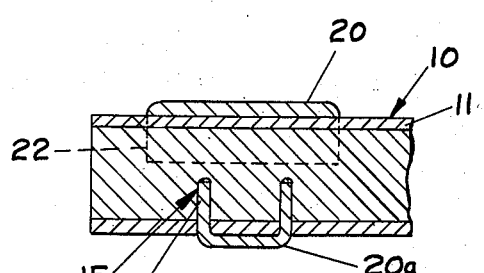
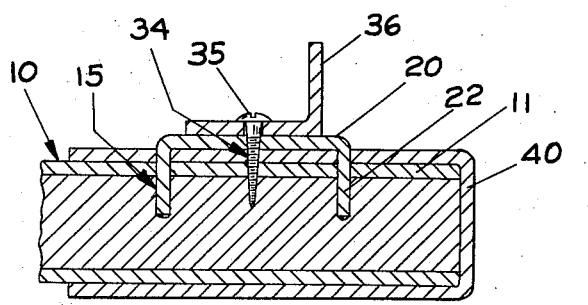

United States Patent Office 2,898,258
Patented Aug. 4, 1959

2,898,258

PANEL AND FASTENER ASSEMBLY AND METHOD OF MAKING SAME

George D. Meier and George E. Kloote, Grand Rapids, and Joseph A. Potchen, Marne, Mich., assignors, by mesne assignments, to Haskelite Manufacturing Corporation, a corporation of Delaware Application January 31, 1955, Serial No. 485,228

12 Claims. (Cl. 154—118)

This invention relates to panels having a hard synthetic resin face and particularly characterized by a low density, expanded cellular, synthetic resin core which of itself is wholly incapable of gripping a conventional fastener. The invention concerns itself with the solution of the problem of attaching fasteners to panels of this type.

This invention provides a rapid, simple method and means by which fasteners may be secured to such panels. The method is adapted to use either at the point of manufacture or at the point of use of such panels. The resulting anchorage of the fasteners is strong and positive. It is not subject to failure due to vibration, side loading or other eccentric applications or force.

The method provides an inexpensive means of securing fasteners to such panels. It entirely overcomes the problem of applying fasteners to such panels even though the panels themselves are wholly incapable by reason of the inherent characteristics of their core material of holding conventional threaded or friction fasteners such as screws or nails.

The objectives and advantages of this invention will be more readily seen by those acquainted with the problem attendant the use of laminated panels having low density, expanded cellular, synthetic resin core materials upon reading the following specification and the accompanying drawings.

In the drawings:

Fig. 5 is a sectional elevation view of a modified application of this invention.

Fig. 6 is a sectional elevation view of a modified construction of this invention.

Fig. 7 is a sectional elevation view of a further modified construction of this invention.

Fig. 8 is a fragmentary front view of a further modified application of this invention.

Fig. 9 is a fragmentary sectional view taken along the plane IX—IX of Fig. 8.

Figure 1:
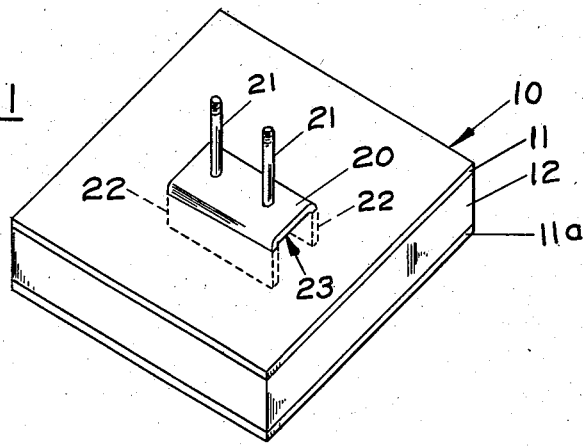
Fig. 1 is an oblique view of a panel to which fasteners have been anchored pursuant to the teachings of this invention.

Referring specifically to the drawings, the numeral 10 indicates a panel having facing sheets 11 and 11a and a core 12. The facing sheets 11 and 11a are of a high density, synthetic resin normally reinforced with a fibrous material in either random or woven form. As an example, such a facing sheet may consist of a cured, high density, polyester resin in which there is embedded filamentary glass as the fibrous, reinforcing material. It will be recognized that numerous other synthetic resins such as the ureas and epoxides will produce a facing sheet which, for the purposes of this invention, will have basically the same characteristics.

The main body of the panel consists of a core 12. This core is of substantial thickness and low density. As an example of the core material with which this invention is designed for use, the core may consist of a slab of rigid, expanded, cellular polystyrene such as that sold by the Dow Chemical Company under the name Styrofoam. Panels of this type for enclosing refrigerated areas are fabricated using a core material of expanded polystyrene having a specific gravity from .032 to .072. Such material is inherently incapable of providing a satisfactory grip for threaded or friction type fasteners. The facing sheets 11 and 11a are too thin to provide an anchorage for such fasteners. It is, therefore, necessary to provide some other means of making attachment to the panel.

Accordingly, for the purpose of providing means of anchoring the fasteners, slots 15 are formed in the panel. One suitable way of making the slots 15 is by routing. The slots 15 are of equal length and parallel. Their depth is such that they penetrate partially through the panel. These slots cut through the facing sheet 11 and penetrate a substantial depth, normally at least ¾ of an inch, into the core 12.

After the slots 15 have been formed, the U-shaped anchor element 20 is secured to the panel. The U-shaped anchor element may be fabricated from any suitable material such as metal or synthetic resin. If it is fabricated of a synthetic resin, it is contemplated that it may consist of a formed sheet of cured, high density, polyester resin in which filamentary glass is embedded as a reinforcing material. The anchor element 20 is formed into its channel shape at the time of its initial fabrication. The length of the anchor element 20 substantially equals the length of the slots 15.

In the type of installation illustrated in Fig. 1, the actual fasteners, in this case bolts 21, are first mounted to the anchor elements. For this purpose the anchor elements are drilled and the bolts inserted from within the anchor elements with their heads bearing against the back surface of the element.

After the bolts have been so assembled to the anchor element 20, it is ready for attachment to the panel. To secure the anchor element 20 to the panel, an adhesive is used as the bonding agent. A sufficient quantity of this adhesive is introduced into the slots 15 to assure complete filling of all voids in the slots after legs 22 of the anchor element have been inserted. As the legs 22 are forced into the slots the adhesive is squeezed to the panel's surface between the legs and the sides of the slots.

This method of applying the adhesive assures complete bonding of the anchor element to the panel. It is a more positive way of effecting complete bonding than coating the legs of the anchor element and then inserting them into the panel. This latter method may be used in situations in which it is not possible to first apply the adhesive to the slots.

An epoxy resin has been found to be an effective resin for the adhesive. It will be recognized that various other adhesives may be used. The selection of the particular adhesive will depend partially upon the materials from which the panel is fabricated. The adhesive must be one which upon curing will be bondable to these materials and which in its uncured state will not act as a solvent for them.

Where the fasteners are bolts having heads projecting from the back surface of the anchor element 20, the anchor element 20 may be inserted until the heads contact the facing sheet 11. When necessary, suitable cutouts may be made in the facing sheet 11 to receive the bolt heads. When this is done, the entire back surface 23 of the anchor element 20, including the bolt heads, may be coated with the same adhesive as used on the legs 22. By this means the fastener is not only secured by the legs 22 but also to the facing sheet 11.

It will be recognized that while the invention is described as used with a panel having a facing sheet 11, that it may be applied with equal facility to a panel from which the facing sheet 11 has been omitted. In this case, the slots 15 are merely routed in the core and the anchor element 20 inserted in the core in the same manner and to the same depth as that utilized when the facing sheet 11 is present.

It will be recognized that the depth of penetration of the legs 22 will depend in part upon the thickness of the core 12 and upon the ultimate strength it is desired to develop in the joint between the anchor element and the panel 10. In any case the slots 15 should be no deeper than that necessary to conveniently receive the legs 22.

*Example I*

A panel consisting of a slab of rigid, expanded, cellular polystyrene having a specific gravity of 0.032, faced with a facing sheet of the same material as the anchor element except that its thickness was 0.032 of an inch was used. The anchor element used in this test consisted of a U-shaped channel of polyester resin reinforced with woven filamentary glass. The anchor element had a wall thickness of 0.125 of an inch. The anchor element had a length of 4.0 inches. Slots were routed in the panel deep enough to receive the legs of the anchor element. Sufficient adhesive was introduced into these slots to assure their being filled after the legs of the anchor element had been fully inserted.

The adhesive used in this test was an epoxy resin which was allowed to cure at room temperature. After the adhesive was fully cured, the anchor element was placed under a pull normal to the face of the panel until failure occurred. Failure occurred by the anchor element tearing loose from the panel when a pull of 685 lbs. was applied. Inspection of the anchor element after failure revealed that a portion of the core and facing sheet immediately adjacent the legs of the anchor element remained attached to the anchor element.

Figure 2:
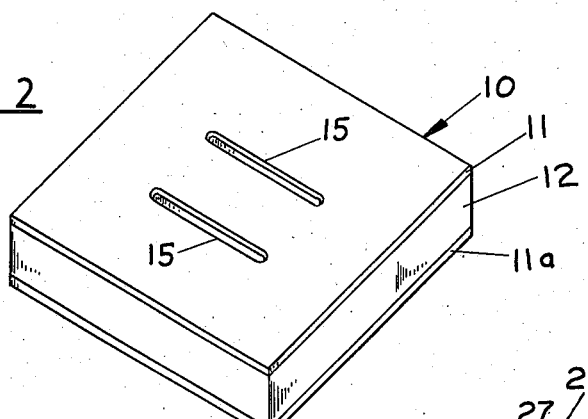
Fig. 2 is an oblique view of a panel slotted in preparation for attachment of the fastener anchor.
Figure 4:
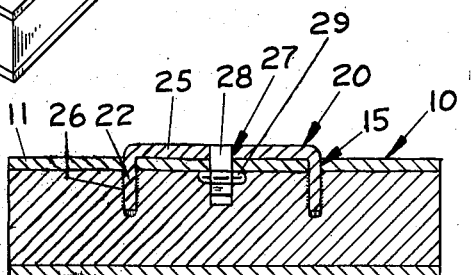
Fig. 4 is a sectional elevation view of a panel illustrating another use for this invention.

Fig. 4 illustrates a somewhat modified form of this invention. In this figure, the panel 10, having facing sheets 11 and 11a separated by a core 12 to which the facing sheets are intimately bonded, has cut into it slots 15 such as those illustrated in Fig. 2. By means of these slots the anchor element 20 is attached, the legs of the anchor element being inserted into the core 12 of the panel. In this case the anchor element 20 is inserted until the web portion 25 of the anchor element 20 is in contact with the facing sheet 11. Adhesive is applied to both the legs 22 and to the inside surface of the web portion 25, thus, effecting a bond not only to the core 12 but also to the facing sheet 10.

Since the core material 12 is cellular, the walls of the slots 15 are somewhat irregular and there is a certain penetration of the core by the adhesive on the legs 22, as indicated by the hatch lines at 26. This penetration is limited to those cells immediately adjacent the edge of the slots, the walls of which are ruptured by the cutting of the slots. After the anchor element 20 has been installed, holes 27 for the fasteners 28 are drilled through the anchor element and the facing sheet and partially into the core 12. A deformable anchor element 28 is then inserted and pulled up to cause a portion of the anchor element to deform and spread out behind the facing sheet 11, forming the wings 29. The wings 29 bear against the back surface of the facing sheet 11. The low density of the core material permits these wings to penetrate as far as necessary without any substantial interference. Blind fasteners of this type are manufactured by a number of companies and are conventional equipment. The mechanics of the fastener itself is not considered to be a portion of this invention. After the fastener has been installed, other members may be secured to the panel by means of bolts threaded into the fasteners.

In the case of panels in which the facing sheet 11 has been omitted, the anchor element 20 is inserted until the back of the web 25 is in contact with the exposed surface of the core 12. The fastener 28 is then inserted and the wings 29 formed bearing against the back surface of the web 25.

Fig. 5 illustrates a different application of this invention. In Fig. 5, the panel 10 is routed to form a pair of slots 15 for reception of the legs 22 of the anchor element 20. However, at the time of installation, no fasteners are attached to the anchor element. After the anchor element has been mounted on the panel 10 and the securing adhesive has set, openings 34 of suitable size are drilled through the anchor element 20 and the adjacent facing sheet 11 of the panel. The size of the opening 34 is such that when the threaded screw 35 is installed it will cut its own threads in the walls of the hole as it passes through the anchor element 20 and the facing sheet 11. The combined thickness of these two members is such that the threads of the screw will find a firm and positive anchorage and the screw will be capable of withstanding the loads imposed by the bracket 36. Since the screw 35 passes a major portion of its load to the anchor element 20, this load is transferred by the legs 22 to the panel in the form of shear. This arrangement eliminates the necessity for inserting fasteners in the anchor element before its attachment. It also eliminates the necessity for providing blind cut-outs in the face of the panel beneath the anchor element to receive any fastener heads which may project inwardly at the time of installation.

*Example II*

Tests were conducted to determine the pull required to detach threaded fasteners from a channel of polyester resin having a woven, filamentary glass reinforcement. The wall thickness of the channel was 0.125 of an inch. In each case the fastener was threaded into the channel, cutting its own thread pattern in the channel. The force was applied in tension and failure occurred by the fastener withdrawing from the channel. The results of these tests are as follows:

| Test No. | Type of Fastener | Pull in Tension in Lbs. |
|---|---|---|
| 1 | No. 10 self-tapping Metal Screws | 352 |
| 2 | do | 250 |
| 3 | do | 256 |
| 4 | No. 10 Wood Screws | 254 |
| 5 | do | 344 |
| 6 | do | 252 |

Fig. 6 illustrates another method of securing fasteners to synthetic resin panels having a low density core. Again, the anchor elements 20 are utilized. In this case, a metal plate 37 is placed between the web of the anchor element and the face of the panel at the time the anchor element is installed. After the adhesives used to secure the anchor element to the panel have set, a suitable opening 38 is drilled through the anchor element 20, metal plate 37 and the facing sheet 11. Thereafter, the hole 38 in the metal plate 37 is tapped for reception of a machine screw 39. The machine screw holds the angle 36. It will be recognized that in the process of tapping the metal plate 37 that at least that portion of the hole passing through the anchor element 20 will also be tapped. This, however, is immaterial because the metal plate provides the main anchorage for the machine screw 39. The loads imposed by the angle 36 will be transmitted to the metal plate 37.

These will be transmitted to the anchor element 20 and by means of the legs 22 to the panel 15 as shear loads.

*Example III*

In these tests the same type of channel was employed as that used in Examples I and II. This channel was fabricated from a polyester resin reinforced with a woven, filamentary glass and had a wall thickness of 0.125 of an inch. In test No. 1 a 0.125 of an inch thick plate of steel was placed within the channel against the inside surface of the channel's web. In the second test the plate had a thickness of 0.0625 of an inch. A clearance hole was provided in the channel web aligned with a hole in the plate, tapped to receive a ¼—24 bolt. The legs of the channel were firmly grasped in a jig. One-fourth inch diameter stove bolts were threaded into the steel plates. A pull was applied to place the bolts in tension. In both tests the jig holding the channel failed at 800 lbs. Neither the channel nor the plate exhibited any sign of failure.

Fig. 7 shows a modified form of the arrangement shown in Fig. 5. In this case, the fasteners are to be attached adjacent the edge of a panel where the exposed edge has been enclosed by means of a jacket 40. In this case, the slots 15 for the reception of the legs 22 of the anchor element 20 are formed not only through the facing sheet 11 and into the core of the panel 10 but also through the legs of the jacket 40. Again, the loads imposed by the screw 35 are transmitted to the legs 22 of the anchor element 20 where they are imposed upon the panel 10 in shear. As in the case of the installation shown in Fig. 5, the loads imposed by the screw 35 upon the facing sheet 11 and the leg of the jacket 40 are also transmitted in shear inasmuch as any tendency of these parts to separate from the core of the panel under tension is resisted by the web of the anchor element 20. In both this installation and the one illustrated in Fig. 5, the screw may penetrate partially into the core. It is normally unnecessary to drill a hole in the core to admit the screw since it may readily penetrate the low density material forming the core.

Each of the forms of attachment shown in Figs. 5, 6 and 7 provides a means of firmly securing components to the panels by an attachment which causes the loads to operate in shear. This permits imposition of high loadings. In addition, all of these forms of attachment make it possible to anchor to low density, synthetic resin core panels without the necessity of passing a fastener entirely through the panel thus breaching the moisture barrier created by the panel. It will be recognized that the angle 36 shown in each of these figures, is merely illustrative of the innumerable types of components which may be attached by this means.

Figs. 8 and 9 show the application of this invention where it is necessary to use anchor elements on opposite faces of the panel. In order to avoid cutting into the panel from both faces in the formation of the slots 15, thus, in some cases practically severing the panel through, one of the anchor elements is arranged at a right angle to the other. In this case, the anchor element 20 has its greater axis normal to the greater axis of the anchor element 20a. Thus, the slots 15 only approach each other at four points, that being where the slots intersect. The panel is not seriously weakened by the installation from both faces. This is a particularly desirable arrangement where it is necessary to attach a latch or other hardware to the panel which requires an installation either piercing the panel or a portion of the hardware on each side of the panel.

Figure 3:
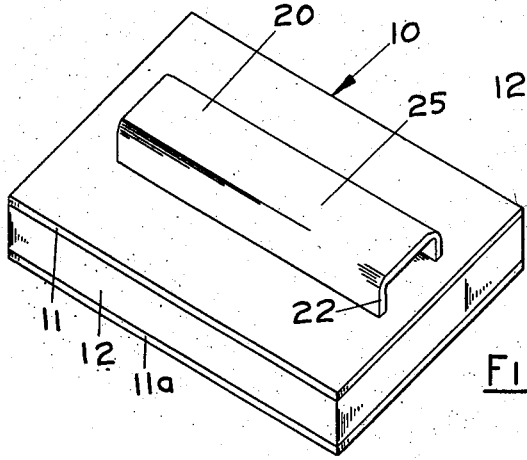
Fig. 3 is an oblique view of a panel having the fastener anchoring member partially inserted therein.

Fig. 3 illustrates another application of this invention. In this case, the anchor element 20 is designed to serve as a crash strip or a protective bumper for the panel. In this case the web 25 of the anchor element 20 is caused to stand out a short distance from the surface of the panel. The anchor element 20 is either made with longer legs 22 or it is not inserted into the panel the same depth as illustrated in Figs. 1 and 4. Such a crash strip applied to a panel will act as a bumper to ward off blows from moving objects before they actually make contact with the panel's surface. It will also be understood that narrow strips of the anchor element 20, mounted in the manner illustrated in Fig. 3, may be used as loops or hangers from which articles or equipment may be suspended. They may also be used simply as handles or grips. From this single illustration it is obvious that this invention provides a means by which anchors may be attached to a low density core panel by means of a high strength joint for a wide range of purposes. The invention is highly adaptable and its use as a means of securing fasteners is to be considered as illustrative rather than as a limitation of its possible application.

It will also be recognized that while the anchor element 20 has been described as being U-shaped and, therefore, having two parallel legs penetrating the panel, it could have a variety of other shapes such as a T-shape with one leg of the T inserted into the panel. Again, the depth to which the anchor element is inserted into the panel is dependent upon the thickness of the panel, the length of the leg and the strength it is desired to develop in the joint.

While a preferred embodiment of this invention and a few of the possible modifications thereof have been described, it will be recognized that various other modifications may be made without departing from the principles of this invention. Each of these modifications is to be considered as included in the hereinafter appended claims unless these claims by their language expressly state otherwise.

We claim:

1. In the method of securing fasteners to a laminated rigid panel having a low density, cellular, synthetic resin core and a solid facing sheet adhesively secured to said core, the steps which include forming an elongated slot in said panel substantially normal to the face thereof, said slot having a depth greater than the thickness of said facing sheet and less than the thickness of said core, providing a fastener anchor member having a web portion and a leg portion depending from said web portion and said leg being adapted to be received into said slot, inserting said leg in said slot and simultaneously securing said leg to said panel and said facing sheet by a cold setting adhesive bondable upon curing to both said leg and said core, and curing said adhesive.

2. In the method of securing fasteners to a laminated rigid panel having a low density, cellular, synthetic resin core and a solid facing sheet adhesively secured to said core, the steps which include forming an elongated slot in said panel substantially normal to the face thereof, said slot having a depth greater than the thickness of said facing sheet and less than the thickness of said core, providing a fastener anchor member having a web portion and a leg portion depending from said web portion, said leg portion being adapted to be received into said slot, coating said leg with a cold polymerizing adhesive bondable upon curing to said core, inserting said leg in said slot while said adhesive is flowable so as to position said web portion in direct contact with said facing sheet and curing said adhesive.

3. In the method of securing fasteners to a rigid panel having a low density, cellular, synthetic resin core, the steps which include: forming an elongated slot in said panel substantially normal to the face thereof, said slot having a depth less than the thickness of said core; providing a fastener anchor member having a leg adapted to be received into said slot; mounting fasteners to said anchor memebr; inserting said leg in said slot and simultaneously securing said leg to the walls of said opening by an adhesive bondable upon curing to both said leg and said walls of said opening; curing said adhesive.

4. In the method of securing fasteners to a rigid panel having a hard facing sheet of synthetic resin and a low density, cellular, synthetic resin core, the steps which include: forming an elongated slot in said panel through one facing sheet thereof and penetrating said core less than the thickness thereof; providing a fastener anchor member having a leg shorter than the depth of said slot; inserting said leg in said slot and simultaneously securing said leg to said panel by an adhesive bondable upon curing to both said leg and said core; curing said adhesive; forming a hole through said anchor member and said facing sheet; inserting a deformable fastener into said opening; deforming one end of said fastener against the back of said facing sheet.

5. In the method of securing fasteners to a rigid panel having a low density, cellular, synthetic resin core, the steps which include: forming an elongated slot in said panel having a depth less than the thickness of said core; providing a fastener anchor member having a leg; inserting said leg in said slot and simultaneously securing said leg to said panel by an adhesive bondable upon curing to both said leg and said core; curing said adhesive; forming a hole through said anchor member; inserting a deformable fastener into said opening; deforming one end of said fastener against the back of said anchor member.

6. In a panel and fastener assembly the combination comprising: a panel having a rigid, low density, cellular, synthetic resin core; a pair of parallel elongated slots in said core having a depth less than the thickness of said core; a U-shaped anchor member having a web and a pair of legs, each of said legs being received into one of said slots; a metal plate seated and firmly held between said web and the face of said panel; an adhesive for bonding said legs to said core.

7. In a panel and fastener assembly the combination comprising: a panel having a rigid, low density, cellular, synthetic resin core; a pair of parallel elongated slots in said core having a depth less than the thickness of said core; a U-shaped anchor member having a web and a pair of legs, each of said legs being received into one of said slots; a metal plate seated and firmly held between said web and the face of said panel; a hole through said web and said plate; at least that portion of said hole in said plate being tapped to receive a threaded fastener; an adhesive for bonding said legs to said core.

8. In a panel and local reinforcement assembly, the combination comprising: a panel having a rigid, low density, cellular, synthetic resin core; a pair of parallel elongated slots in each face of said panel; the center of the area embraced by each of said pairs of slots being substantially aligned transversely of said panel; the direction of one pair of said slots being normal to the direction of the other pair of said slots; a pair of U-shaped anchor members, each having a pair of legs, the legs of each of said anchor members being received into one of said pairs of slots; an adhesive for bonding said legs to said core.

9. A panel and fastener assembly comprising a laminated panel having a rigid, low density, cellular synthetic resin core and at least one solid facing sheet adhered to at least one surface thereof, an elongated slot extending through said facing sheet and partially through said core, and an anchor member having a web portion and at least one leg portion depending from said portion, said leg portion being mounted in said slot and adhesively bonded to both said core and said facing sheet so that said web portion is in direct contact with said facing sheet.

10. A panel and fastener assembly comprising a laminated panel consisting of a low density cellular synthetic resin core and at least one solid facing sheet adhered to at least one surface thereof, a pair of elongated slots extending through said facing sheet and partially through said core, and an anchor member having a web portion and a pair of legs depending therefrom, said legs being spaced and oriented so as to be received by said slots, said slots and said legs having susbtantially similar dimensions, said legs disposed in said slots and adhesively secured to said core and said facing.

11. A panel and fastener assembly in accordance with claim 9 wherein the inner surface of said web is in contact with the surface of said facing sheet and is adhesively bonded to said facing sheet.

12. In the method of securing fasteners to a laminated rigid panel having a low density, cellular, synthetic resin core and a solid facing sheet adhesively secured to said core, the steps which include forming a pair of elongated slots in said panel substantially normal to one face thereof and spaced apart, said slots having a depth greater than the thickness of said facing sheet and less than the thickness of said core, providing a fastener anchor member having a web portion and a pair of parallel legs depending therefrom and adapted to be received into said slots, introducing a quantity of cold polymerizing adhesive into said slots, pressing the legs of said anchor member into said slots while said adhesive is flowable and simultaneously causing said adhesive to form a film between said legs and the walls of said slots and said facing sheet, creating a hole through said anchor member and into said panel, and securing a fastener into said hole.

References Cited in the file of this patent
UNITED STATES PATENTS

| | | |
|---|---|---|
| 2,005,895 | Hengstenberg | June 25, 1935 |
| 2,151,447 | Stanley | Mar. 21, 1939 |
| 2,364,226 | Larmour | Dec. 5, 1944 |
| 2,482,339 | Hibbard et al. | Sept. 20, 1949 |
| 2,509,494 | Gruenwald | May 30, 1950 |
| 2,511,168 | Martin et al. | June 13, 1950 |
| 2,618,901 | Braun | Nov. 25, 1952 |
| 2,639,257 | Szegvari et al. | May 19, 1953 |
| 2,654,685 | Voelker | Oct. 6, 1953 |
| 2,663,662 | Graf et al. | Dec. 22, 1953 |
| 2,690,879 | Snyder | Oct. 5, 1954 |
| 2,718,485 | Samuely | Sept. 20, 1955 |
| 2,730,772 | Jones | Jan. 17, 1956 |
| 2,734,297 | Dunklee | Feb. 14, 1956 |
| 2,779,979 | Sundelin et al. | Feb. 5, 1957 |

FOREIGN PATENTS

| | | |
|---|---|---|
| 584,165 | Great Britain | Jan. 8, 1947 |